US009545121B2

(12) United States Patent
Perentes et al.

(10) Patent No.: US 9,545,121 B2
(45) Date of Patent: Jan. 17, 2017

(54) CAPSULE FOR PREPARING A BEVERAGE BY CENTRIFUGATION IN A BEVERAGE PREPARATION DEVICE AND DEVICE ADAPTED THEREFORE

(71) Applicant: NESTEC S.A., Vevey (CH)

(72) Inventors: Alexandre Perentes, Lausanne (CH); Christian Jarisch, Lutry (CH); Alfred Yoakim, St-Legier-la Chiesaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/254,574

(22) Filed: Apr. 16, 2014

(65) Prior Publication Data

US 2014/0227414 A1    Aug. 14, 2014

Related U.S. Application Data

(62) Division of application No. 13/133,442, filed as application No. PCT/EP2009/066573 on Dec. 8, 2009, now abandoned.

(30) Foreign Application Priority Data

Dec. 9, 2008   (EP) .................................... 08171069

(51) Int. Cl.
    *A23L 2/395*    (2006.01)
    *B65D 85/804*   (2006.01)
    *A47J 31/22*    (2006.01)

(52) U.S. Cl.
    CPC ................ *A23L 2/395* (2013.01); *A47J 31/22* (2013.01); *B65D 85/8043* (2013.01)

(58) Field of Classification Search
    CPC ...... B65D 85/8043; A23L 2/395; A47J 31/22; A47J 31/00; A47J 31/02; A47J 31/0642; A47J 31/0673; A47J 31/3623; A47J 31/3676; A47J 31/3695; A47J 31/06; A47J 31/0657; A47J 31/0668; A47J 31/24; A47J 31/32; A47J 31/34; A47J 31/36; A47J 31/368; A47J 31/369; A47J 31/40; A47J 31/407
    (Continued)

(56) References Cited

U.S. PATENT DOCUMENTS 4,545,296 A    10/1985  Ben-Shmuel
4,775,048 A *  10/1988  Baecchi ................ A47J 31/407
                                              206/0.5
(Continued)

FOREIGN PATENT DOCUMENTS

CA    2046558 A3 *   1/1992
CN    1419516         5/2003
(Continued)

OTHER PUBLICATIONS

Machine Translation of Foreign Patent Document FR2041380 (Bourgogne). Jan. 1971.*
(Continued)

*Primary Examiner* — Michele L Jacobson
*Assistant Examiner* — Ericson M Lachica
(74) *Attorney, Agent, or Firm* — K&L Gates LLP

(57) ABSTRACT

Capsule insert able in a beverage production device for preparing a beverage from a substance contained in the capsule by introducing liquid in the capsule and passing liquid through the substance using centrifugal forces for producing the beverage which is centrifuged peripherally in the capsule relatively to a central axis of the capsule corresponding to an axis of rotation during the centrifuging operation comprising: an enclosure containing a predetermined amount of beverage substance, a cup-like shaped
(Continued)

body, an upper wall for closing the body, wherein it comprises a flange-like rim extending outwardly from the body which comprises an annular raising portion forming a restriction for the centrifuged liquid How path when said portion is engaged by a pressing surface of the beverage production device.

18 Claims, 13 Drawing Sheets

(58) Field of Classification Search
USPC . 426/77, 78, 79, 80, 81, 82, 83, 84; 99/295, 302 C, 275
See application file for complete search history.

(56) References Cited

U.S. PATENT DOCUMENTS

| | | | |
|---|---|---|---|
| 5,449,823 | A | 9/1995 | Lerch |
| 5,573,926 | A | 11/1996 | Gunata et al. |
| 6,013,289 | A | 1/2000 | Blank et al. |
| 6,838,100 | B2 | 1/2005 | Jaeger et al. |
| 2007/0202237 | A1* | 8/2007 | Yoakim et al. ............... 426/590 |
| 2007/0224319 | A1* | 9/2007 | Yoakim .............. B65D 85/8043 426/433 |
| 2010/0303965 | A1* | 12/2010 | Mariller .............. A47J 31/3628 426/84 |
| 2011/0236541 | A1* | 9/2011 | Gerbaulet ............... A47J 31/22 426/106 |

FOREIGN PATENT DOCUMENTS

| | | |
|---|---|---|
| CN | 101309621 | 11/2008 |
| DE | 2116339 | 10/1972 |
| DE | 3241606 | 3/1984 |
| DE | 3529053 | 2/1987 |
| DE | 3529204 | 2/1987 |
| DE | 3719962 | 6/1988 |
| DE | 4240429 | 6/1994 |
| DE | 4439252 | 5/1996 |
| DE | 102005007852 | 8/2006 |
| EP | 0367600 | 5/1990 |
| EP | 0490794 | 6/1992 |
| EP | 0582050 | 2/1994 |
| EP | 0651963 | 5/1995 |
| EP | 0749713 | 12/1996 |
| EP | 1104654 | 6/2001 |
| FR | 2041380 A1 * | 1/1971 |
| FR | 2132310 | 11/1972 |
| FR | 2487661 | 2/1982 |
| FR | 2513106 | 3/1983 |
| FR | 2535597 | 5/1984 |
| FR | 2624364 | 6/1988 |
| FR | 2685186 | 6/1993 |
| FR | 2686007 | 7/1993 |
| FR | 2726988 | 5/1996 |
| GB | 2253336 | 9/1992 |
| JP | 2003259835 | 9/2003 |
| JP | 2005000157 | 1/2005 |
| WO | 0130179 | 5/2001 |
| WO | WO2006045537 | 5/2006 |
| WO | WO2006112691 | 10/2006 |
| WO | 2007024111 | 3/2007 |
| WO | WO2007041954 | 4/2007 |
| WO | 2008133173 | 11/2008 |
| WO | WO2008148646 | 12/2008 |
| WO | WO 2008148646 A1 * | 12/2008 .............. A47J 31/22 |
| WO | WO2008148656 | 12/2008 |
| WO | 2009114954 | 9/2009 |
| WO | WO 2009106175 A1 * | 9/2009 |
| WO | WO2010066705 | 6/2010 |
| WO | 2010094327 | 8/2010 |

OTHER PUBLICATIONS

Re-Examination received in Chinese Application200980157783.1 mailed Oct. 31, 2014, 18 pages.
"Research Progress of Chemical Ingredients in Chinese Traditional Medicine Fenugreek", Science and Technology of Chinese Traditional Medicine, vol. 2, No. 5, Dec. 31, 2000.
PCT International Search Report for International Application No. PCT/EP2009/066573, International Filing Date Aug. 12, 2009, with Date of Actual Completion Feb. 4, 2010, Date of Mailing Feb. 15, 2010.
Wikipedia Article "Ligusticum wallichii" from http://en.wikipedia.org/wiki/Ligusticum_chuanxiong, 1 page. Accessed Sep. 2, 2014.
Wikipedia Article "Lovage" from http://en.wikipedia.org/wiki/Lovage, 4 pages. Accessed Sep. 2, 2014.
Article Entitled: "How Idli Dosa batter fermentation works?" IndiaCurry.com, from http://www.indiacurry.com/south/batterexplained.htm, 2 pages, Retrieved on Sep. 2, 2014.
Article Entitled: "South Indian Idlis", Chef in You, 2009, from http://chefinyou.com/2009/01/idli-recipe, 12 pages, Retrieved on Sep. 3, 2014.

* cited by examiner

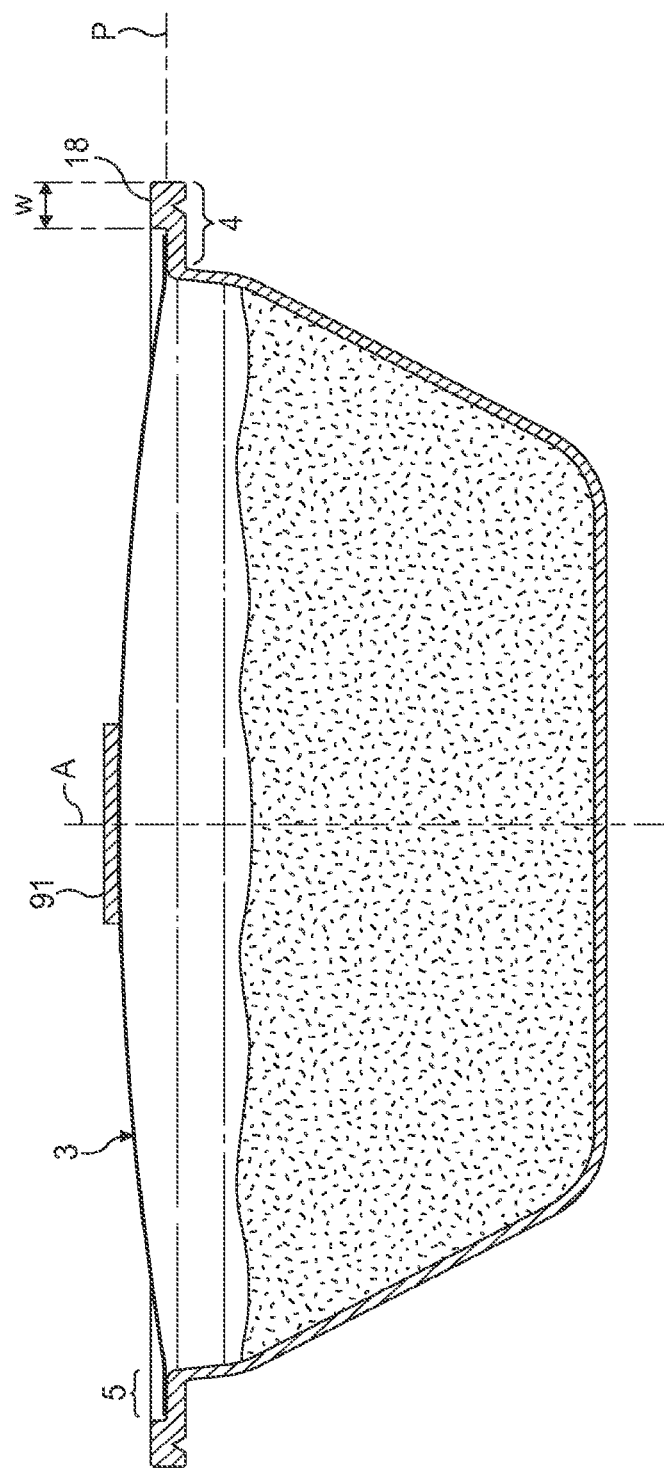

CAPSULE FOR PREPARING A BEVERAGE BY CENTRIFUGATION IN A BEVERAGE PREPARATION DEVICE AND DEVICE ADAPTED THEREFORE

PRIORITY CLAIM

This application is a divisional application of U.S. patent application Ser. No. 13/133,442, filed on Aug. 19, 2011, which is a National Stage of International Application No. PCT/EP2009/066573, filed Dec. 8, 2009, which claims priority to European Application No. 08171069.1, filed Dec. 9, 2008, the entire contents of which are incorporated herein by reference.

FIELD OF THE INVENTION

The present invention relates to a capsule and a device for preparing a beverage from a beverage substance contained in the capsule by passing a liquid through the substance using centrifugal forces.

BACKGROUND

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 60081. Such devices have many disadvantages. Firstly, the coffee powder must be properly dosed manually in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; IJ\702007/041954; DE3529204; DE3719962; FR2685186; DE3241606 and U.S. Pat. No. 4,545,296.

However, the effect of centrifugal forces to brew coffee or prepare other food substances presents many advantages compared to the normal brewing methods using pressure pumps. For example, in "espresso" coffee-type brewing methods, it is very difficult to master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

WO 2006/045537 relates to a capsule comprising elastic biasing means at its flange-like rim. This capsule is intended to be used in a coffee machine providing liquid under pressure with no centrifugal effect being involved. The elastic biasing means is placed between the sidewall and the rim to provide a liquid pressure tight arrangement with the injection part of the machine. However, the biasing means is not intended to form a valve means with the machine which selectively opens under the force of the centrifuged liquid. On the contrary, it serves to maintain a liquid-tight engagement between the rim and the injection part of the machine during the extraction of the beverage.

Therefore, there is a need for proposing a new capsule system adapted therefore for which the extraction parameters can be better and more independently controlled for improving quality of the delivered food liquid.

There is also a need for providing a solution enabling to improve the extraction characteristics, i.e., total solid content (Tc), level of foam/crema, of the existing systems, e.g., coffee preparation devices, using the principle of centrifugation.

At the same time, there is a need for a way of preparing a beverage which is more convenient and cleaner compared to the prior art centrifugal coffee preparation device, in particular a solution which does not require the hassle of removing coffee waste from the centrifuging receptacle.

For this, the invention relates to a capsule insertable in a beverage production device for preparing a beverage from a substance contained in the capsule by introducing liquid in the capsule and passing liquid through the substance using centrifugal forces for producing the beverage which is centrifuged peripherally in the capsule relatively to a central axis of the capsule corresponding to an axis of rotation during the centrifuging operation comprising. The capsule comprises an enclosure containing an amount of beverage substance, a cup-like shaped body and an upper outer wall for closing the body. The capsule further comprises a flange-like rim extending outwardly from the body which comprises an annular raising portion forming a restriction for the centrifuged liquid flowpath when said portion is engaged by a pressing surface of the beverage production device.

The annular raising or force-setting portion forms with the pressing surface of the beverage production device a restriction valve means for the flow of beverage. The raising portion is more particularly configured to selectively block and/or restrict the flow path of the centrifuged liquid in order to delay its release from the capsule and regulate the flow when released. More particularly, when a sufficient pressure of the centrifuged liquid is reached at the valve means, i.e., the centrifuged liquid forcing against the raising portion, the valve means opens, i.e., a restricted flow gap is provided by the pressing surface of the device moving away from the raising portion of the capsule or vice versa. Before the pressure of the centrifuged liquid is attained, the valve means remain closed or restricted at a minimum gap. Hence, the raising portion blocks or restricts the flowpath for the centrifuged liquid. Thereby, the annular raising portion determines the backpressure at the valve means the centrifuged liquid must overcome to pass through the valve for a certain flow rate.

Furthermore, it should be noted that the opening of the valve means may be dependent on the rotational speed of the driving means which drive the capsule in rotation in the beverage production device. For a centrifugal extraction, the quality of the beverage to be prepared depends on the control of the parameters, in particular, the flow rate of the released beverage through the valve means. Thereby, the flow rate is influenced by two parameters: the rotational speed of the capsule and the back-pressure exerted on the centrifuged liquid upstream of the valve means. For a given back-pressure as set by the force-setting or raising portion of the rim of the capsule, the higher the rotational speed, the larger the flow rate. Conversely, for a given rotational speed, the larger the back-pressure, the smaller the flow.

Furthermore, as the valve means selectively block the flowpath for the centrifuged liquid, a preliminary wetting step of the beverage substance, e.g., ground coffee, can be carried out as no liquid is yet significantly discharged from the device. As a result of a prewetting and delayed release of the beverage, a thorough wetting of the substance is made possible and the interaction time between the liquid and the beverage substance, e.g., coffee powder, substantially increases and the extraction characteristics, e.g., coffee solid content and beverage yield, can be significantly improved.

In a mode of the invention, the annular raising portion extends in a direction substantially perpendicular to the transversal plane of extension of the flange-like rim. The orientation of the raising portion is thus configured to selectively block the flow of the centrifuged beverage that leaves the capsule along the flange-like rim when the capsule is rotated around its central axis.

Preferably, the annular raising portion extends outwardly and beyond an inward, comparatively lowered, annular portion of the flange-like rim and in a direction opposite to the bottom of the body.

The raising portion extends a certain height from an inner portion of rim. The inward portion of the rim is preferably flat. In certain embodiments, it may form an increase of thickness of the inner portion. The lowered annular portion merges with the sidewall and can be aligned with the upper wall, or alternatively, be placed in the capsule away a certain distance from the upper wall. The annular raising portion thus forms a step or protrusion extending of said distance from such (preferably flat) inward annular portion of the rim to ensure a surelevation independent from the thickness of the body of the capsule. As a result, the control of the surelevation height is made possible independently from the thickness of the rest of the rim or body; therefore providing flexibility in setting the desired back-force in the device while not impacting on the overall design of the capsule, its rigidity and/or affecting the sealing strength with the upper wall (e.g., upper membrane).

In a mode, the inward lowered annular portion forms the sealing surface with the upper wall. Therefore, when the capsule is engaged in the device, a gap is obtained between the upper outer wall of the capsule and the compressed surface or line of the raising portion to ensure the centrifuged liquid can more easily circulate towards the valves after it has passed through the upper wall, e.g., through perforations made through said wall.

In a particular mode, the annular raising portion is covered by the upper wall (e.g., closing membrane), in particular, by forming at least a portion of sealed surface with the upper wall.

In a particular mode, the annular raising portion is preferably rigid. The rigidity is here evaluated in relation to its ability to resist compression by a pressing surface of the beverage production device applying a closure force thereto when the capsule is inserted in the beverage preparation device. In other words, the raising portion remains of a relatively constant dimension during the beverage preparation operations in the device in order for the annular raising portion to play its role of restriction of the beverage flowpath and to ensure a reliable opening.

In a particular mode, the annular raising portion is made integral with the flange-like rim. Therefore, for essentially economical reasons, the annular raising portion can be formed in one piece together with the cuplike shaped body.

Preferably, the flange-like rim of the capsule has a lower surface, merging with said sidewall of the body, which is shaped, in the region directly opposed to the raising portion, to be complementary shaped in regard to an annular supporting surface of the capsule holder.

For this, the lower surface of the rim can be free of any projection in the area directly opposed to the annular raising portion. For instance, the lower surface forms an annular flat surface extending along a plane substantially parallel to the sealed upper surface of the rim. It can thus provide a stable referential support, e.g., a perfectly flat position of the rim relative to the capsule holder, which is important to avoid to form an unbalanced mass during high-speed centrifugation.

The flange-like rim can also comprise an annular groove on its surface directly opposed to the annular raising portion. The annular groove can serve to receive a complementary shaped-indentation of the beverage production device, in particular, provided in the capsule holder. The advantage is to mechanically support and maintain the rigidity of the annular raising portion and prevent it from deforming under the load exerted by the pressing surface of the beverage production device. It also forms a position referencer for the capsule to ensure a correct fitting of the capsule in the capsule holder to avoid an unbalance mass, in case the capsule would be not perfectly aligned in the capsule holder, that would create noise and/or vibrations during centrifugation. Consequently, the flange-like rim of the capsule can be maintained relatively thin. For instance, the rim may be of a thickness comprised between about 0.5 and 1.5 mm.

Advantageously, the annular raising portion is embossed in the flange-like rim. For example, the annular raising portion and groove are made in the same operation such as when the cup-like shaped body is formed by deep drawing or thermoforming. Embossing can also be operated after the forming of the cavity of the body in a subsequent operation.

The cup-like shaped body can also be produced by injection-moulding of thermoplastics with the raising portion being integrated in or overmoulded onto the injected body.

Preferably, the raising portion has gas vent means. The gas vent means enables gas to escape from the enclosure of the capsule during filling of the enclosure with liquid. In absence of such means, a pocket of gas could form in the capsule which would prevent the ingredients from being correctly wetted. For this, the annular raising portion may be provided with at least one radial indentation, preferably several radially oriented indentations, for providing gas escape in a direction outward of the capsule. The at least one radial indentation is preferably sized to allow selective release of gas but retain liquid flow in the enclosure or at least forms only a small liquid leakage. For example, 5 to 10 small radial slots of about 10 to 200 microns, for instance about 50 microns, of height and 1 to 5 mm of width may be provided at the periphery of the raising portion to provide appropriate gas venting. Of course, several radial indentations may also be provided in the raising portion.

The raising portion may also be formed as a partially melt energy director of annular shape raising from the rim when in sealing arrangement with the upper wall (e.g., membrane).

In another possible mode, the annular raising portion is a separate element which is attached to the flange-like rim. For instance, the portion may be sealed to the flange-like rim such as by ultrasonic or heat sealing or be clipped into an annular receiving seat or groove provided in the flange-like rim.

In this case, the annular raising portion can be made of a compressible material such as a rubber elastic material or soft plastic material.

The annular raising portion of the capsule can take an inverted V- or U- or W-like shape or L-like shape.

In the context of the invention, the cup-like shaped body can comprise aluminium and/or plastics. The cup-like shaped body can also be made of plastics only. The capsule further comprises a lid membrane for closing the cup-like shaped body. The capsule can be formed of gas barrier material and closed by the membrane in a gas impervious manner so that the freshness of the beverage substance, e.g., roast and ground coffee particles, is maintained for a prolonged period of time.

The membrane comprises at least a peripheral perforable area neighbouring the sealed portion of the membrane which is sealed onto the flange-like rim of the body.

Hence, the perforable area can be perforated by perforating means of the beverage production device for providing a series of liquid outlets in the capsule. Therefore, liquid being centrifuged in the capsule can leave the capsule via the series of outlets, then, it can exert pressure onto the annular raising portion of the capsule. When the opening pressure is reached, the valve means opens or enlarges for forming a flow restriction gap and the liquid can be centrifuged outside of the capsule and be collected for being dispensed.

In a possible alternative, the capsule of the invention comprises a lid which is porous to liquid, at least at its periphery, instead of a perforable membrane. The porous lid may be formed of paper, plastic and/or aluminium.

The cup-shaped body and/or lid may also be formed of paper, cardboard or another biodegradable material.

For substantially rigid biodegradable materials, the capsule body may be selected amongst PLA (polylactic acid), a starch and resin-based material, and combinations thereof.

In an embodiment, the upper outer wall is formed of an outer perforable, non-porous, membrane and an inner porous layer. The membrane and layer can form together a laminate. The inner porous layer can be a filter layer such as polypropylene or polyurethane elastomer. The perforable, liquid-tight, membrane can be aluminium and/or plastic. The porous layer can ensure liquid tightness around the injection needle in the central region of the upper wall as well as improving cleanness at the perforated outlets to prevent solids from leaving the capsule.

In another possible mode, the capsule comprises an internal filter element inserted in the cup-shaped body. The capsule can be closed by a lid membrane covering the internal filter. The lid membrane can be perforable or peelable. For instance, the internal filter element can be a plastic piece with filtering holes or slots for filtering the centrifuged liquid such as described in patent publication WO 2008/148646. The capsule of the invention can comprise a substance which is extractable, e.g., ground coffee, or dissolvable, e.g., instant coffee or milk powder. In particular the substance can be chosen amongst ground coffee, instant coffee, chocolate, cocoa powder, leaf tea, instant tea, herbal tea, a creamer/whitener, a nutritional composition (e.g., infant formula), dehydrated fruit or plant, culinary powder and combinations thereof.

The capsule may include a gas with the food ingredients which is protective against oxidation of the ingredients such as nitrogen and/or carbon dioxide. The gas may be added in the capsule, e.g., by flushing, before sealing the upper wall on the body.

Preferably, the capsule comprises gas barrier materials enveloping the ingredients' compartment. However, in case the capsule is not gastight 'per se', an outer package can be used to pack the capsule individually or in group of several capsules. In this case, the package is removed before the capsule is inserted in the device.

The invention also relates to the use of a capsule as aforementioned in a beverage preparation device wherein the capsule is centrifuged in the device.

The invention also relates to a beverage preparation device from a capsule as aforementioned, by passing a liquid through the beverage substance in the capsule, comprising:
 a liquid injection head for injecting liquid in the capsule,
 a capsule holder for holding the capsule in the device,
 means for driving the capsule in centrifugation,
 wherein it comprises a pressing surface for applying a determined closing force onto the annular raising portion of the flange-like rim for substantially closing the flowpath to the beverage.

The closing force can be determined to maintain the closure between the annular raising portion and the pressure surface, i.e., the valve means, until a sufficient pressure of the centrifuged liquid is reached directly upstream of the said portion. Such pressure (above atmospheric pressure) can range between 0.1 and 18 bars, preferably 0.5 to 4 bars e.g., about 1.5-2 bar.

The pressing surface and/or the capsule holder is/are associated to spring-loading means for enabling the opening of a flow restriction gap for the centrifuged liquid by the pressing surface moving relatively away from the annular raising portion. It should be noted that the flow restriction gap can be opened between the pressing surface and the capsule by a relative movement between each other. This relative movement can be obtained by either the pressing surface moving away from the capsule or the capsule moving away from the pressing surface such as by the capsule holder being the mobile element. A third option is to have both the pressing surface of the injection head and the surface supporting the capsule holder to move against the force of a springbiasing means.

In a preferred mode of the device, the pressing surface forms a surface of a valve part which is separately moveable from the injection part of the head. As a result, the valve means can act independently from the pressure of contact applied by the injection part of the head. In a preferred design, the injection part comprises perforating members for both injection water in the capsule and extracting centrifuged liquid from the capsule.

More particularly, the injection part comprises outlet perforating members forming filtering means when in perforating engagement in the capsule for the centrifuged liquid when engaged in the capsule.

Therefore, by making independent the valve part from the rest of the head, the valve can open without affecting the relative position of the perforating members with the capsule.

In a particular mode, the pressing surface forms a relatively flat annular surface onto which the annular raising portion of the capsule can press. Hence, a closing action is promoted by an engagement at the valve means under the form of an annular sealing line. Preferably, the surface is substantially parallel to the flange-like rim of the capsule. Of course, the pressing surface could also have a slightly concave or convex line of curvature in radial direction relative to the axis of centrifugation.

According to another feature of the device, the capsule holder can comprise a support surface for supporting the flange-like rim of the capsule and comprising an annular indentation indented to fit into an annular groove of the flange-like rim. As aforementioned, this configuration of the support surface of the capsule holder avoids the deformation of the capsule in the device when the injection head is engaged in compression against the flange-like rim of the capsule.

In another feature of the device, the injection head comprises a central injection needle. The needle is configured to perforate the lid membrane of the capsule. The needle may terminate by one or more liquid inlets for injecting liquid in the capsule. Preferably, the needle is centrally position, i.e., aligned with the axis of rotation. The needle could be omitted if the capsule has a central inlet port provided in its upper wall.

The invention may also relate to a system including the combination of one or more capsules as aforementioned and a device as aforementioned, or a capsule inserted in a device as aforementioned.

Additional features of the invention will appear in the detailed description of the figures which follows:

FIG. 10 is a cross sectional view of the capsule according to another embodiment;

Figure 1:
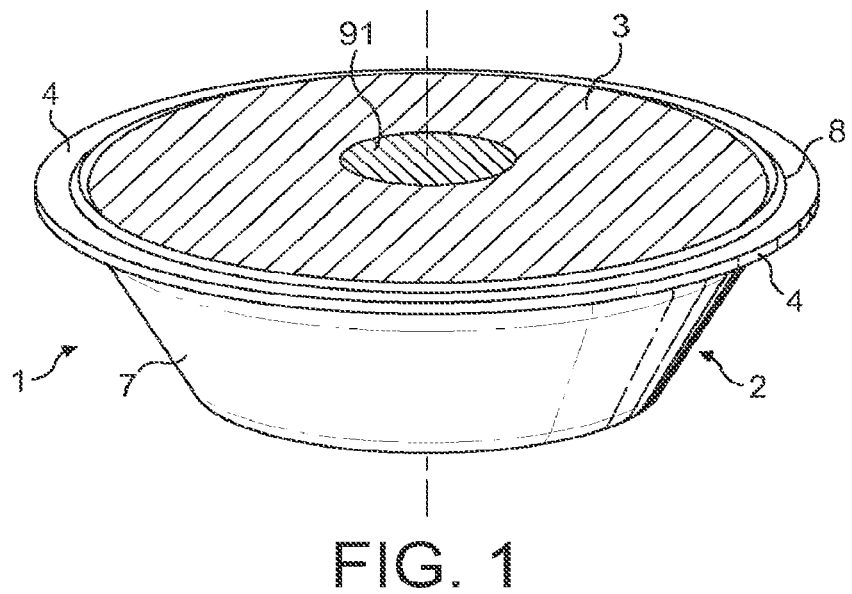
FIG. 1 is a top perspective view of a sealed capsule of the system according to the invention.
Figure 2:
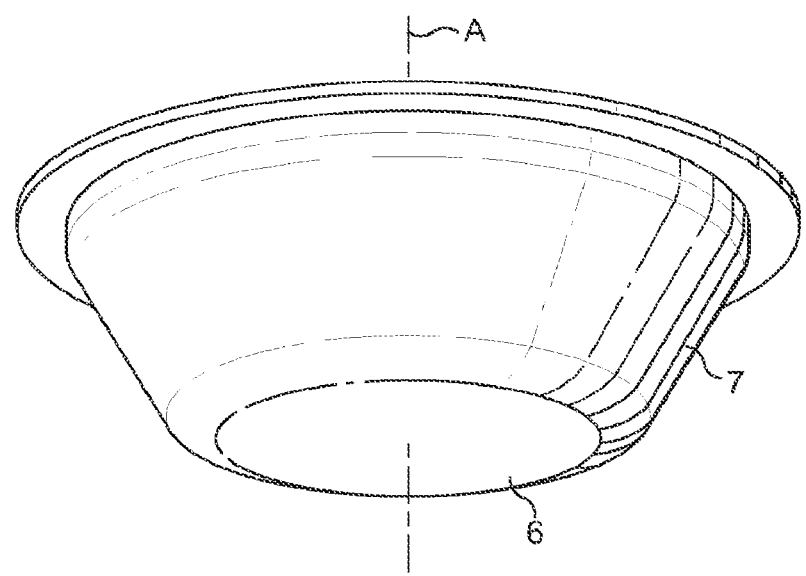
FIG. 2 is a bottom view of the capsule of FIG. 1.
Figure 3:
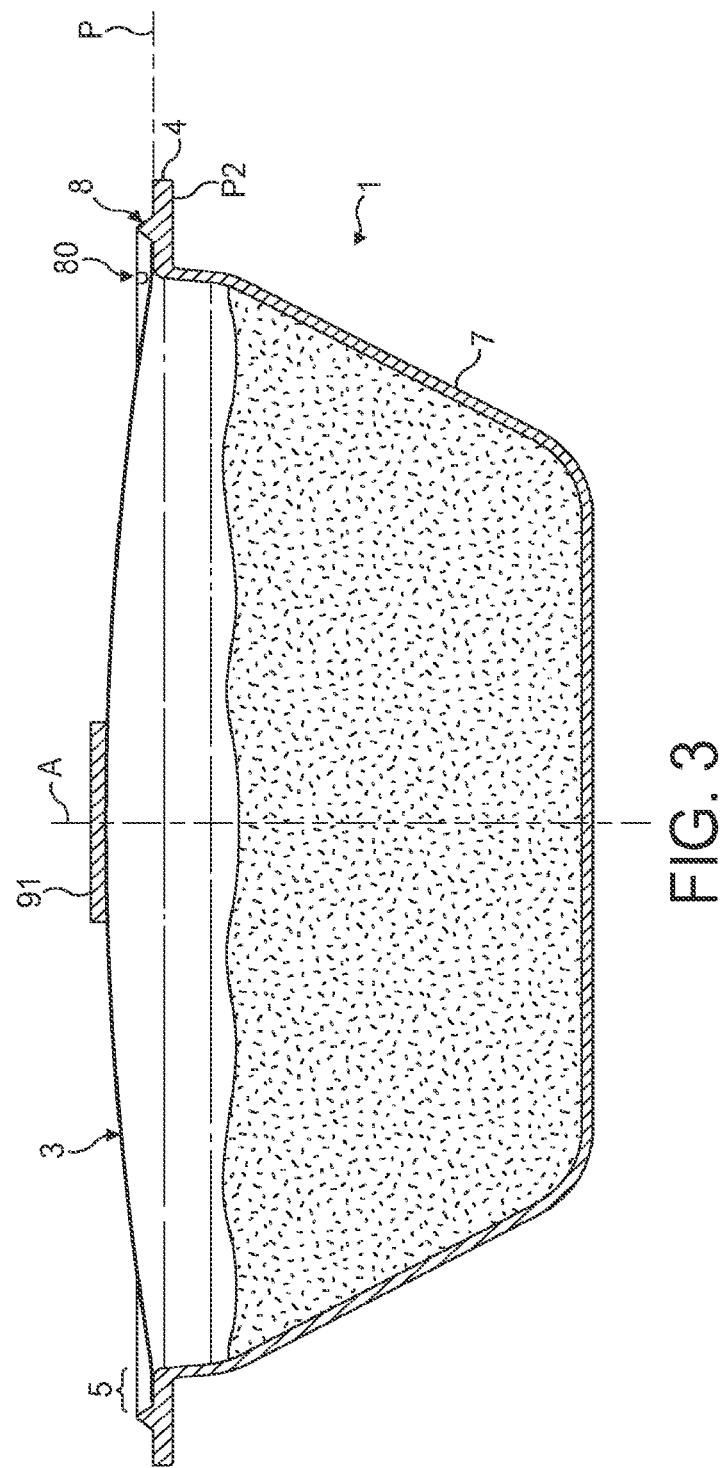
FIG. 3 is a cross sectional view of the capsule of FIGS. 1 and 2.
Figure 4:
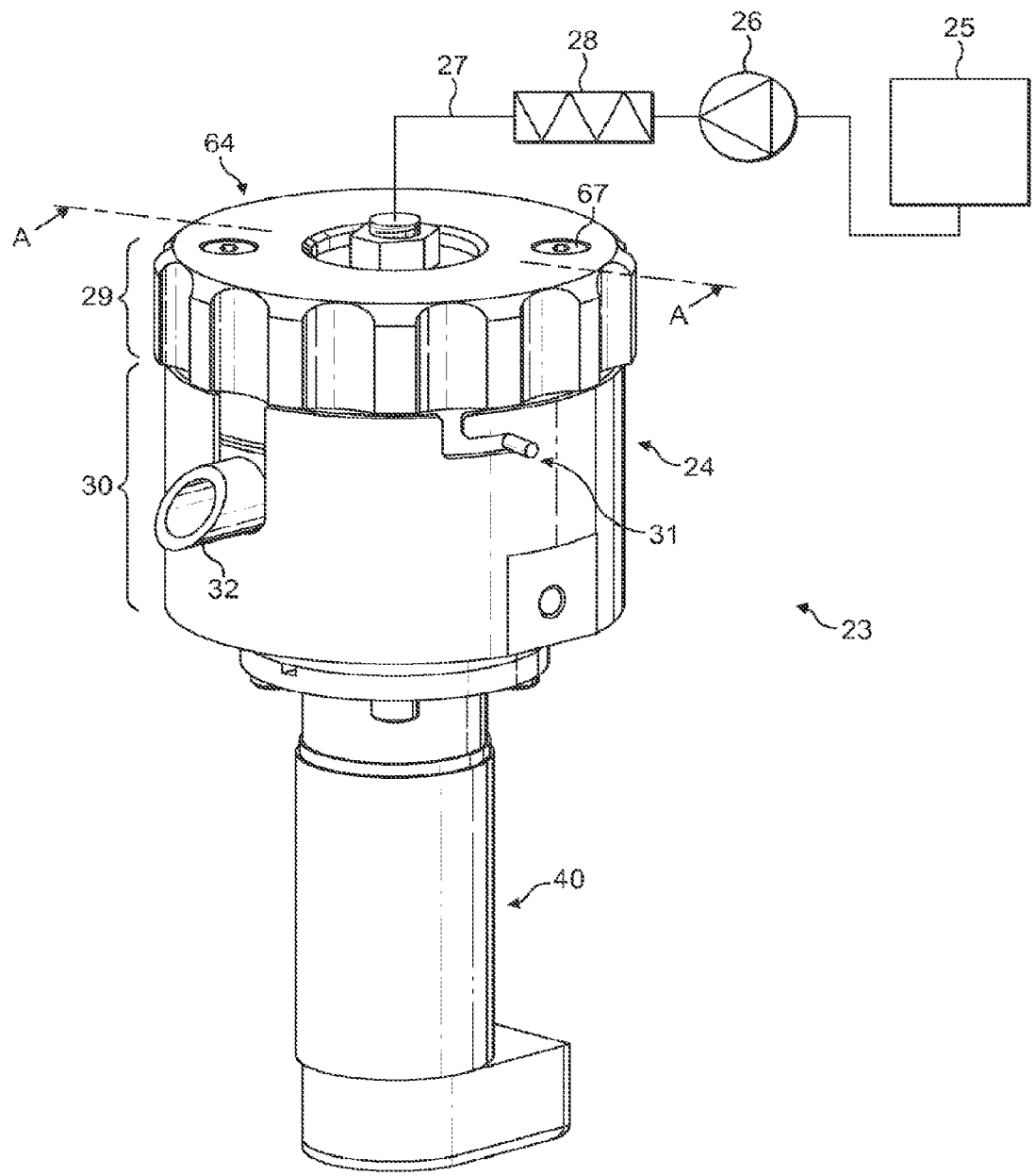
FIG. 4 is a perspective view of the beverage production device of the invention.

As shown in FIGS. 1 and 2, a preferred single-use capsule 1 of the invention generally comprises a dished body 2 onto which is sealed a perforable membrane 3. The membrane 3 is sealed onto a peripheral rim 4 of the body at an inward annular sealed portion 5. The rim 4 can extend outwards forming an annular sealed small portion 5 of between about 2-10 mm. The dished body comprises a bottom wall 6 and a side wall 7 which preferably widens in direction of the large open end of the body opposed to the bottom wall. The dished body is preferably rigid or semi-rigid. It can be formed of a food grade plastic, e.g., polypropylene, with a gas barrier layer such as EVOH and the like or aluminium alloy or a laminate of plastic and aluminium alloy or a biodegradable material (e.g., PLA or starch and fibre-based resin). The membrane 3 can be made of a thinner material such as a plastic film also including a barrier layer or aluminium alloy or a combination of plastic and aluminium alloy. The membrane is usually of a thickness between 20 and 250 microns, for example. The membrane is perforated for creating the water inlet as will be described later in the description. The membrane also further comprises a perforable peripheral area.

Preferably, the capsule forms a symmetry of revolution around a central axis A. However, it should be noted that the capsule may not necessarily have a circular section around axis A but may take another form such as a square, a rectangle, or another polygonal form.

According to an aspect of the invention, the capsule of the invention comprises an annular raising portion 8 extending upwardly from the flange-like rim 4 and forms a force-setting means of a valve means when inserted in the beverage production device as will explained later. More particularly, the raising portion 8 extends in relief from the sealed portion 5 of the flange-like rim which extends along plane P. The sealed portion 5 thus forms an inner lowered annular portion of the rim relative to the portion 8. The raising portion thereby extends in a direction opposite to bottom 6 of the body. The raising portion 8 forms part of a valve means for selectively blocking the flow of the centrifuged liquid coming out of the capsule as will be explained later in the present description.

The portion 8 may not necessarily form a continuous annular portion. In particular, it may be partially or totally interrupted or indented by at least one gas venting channel 80. The channel 80 is radially oriented to create a passage forming a gas communication through the portion to allow gas contained in the enclosure of the capsule to be pushed out of the capsule during the filling of the capsule with liquid. Instead of channels, the indentations could be formed by a multitude of micro-corrugations sufficient to render the raising portion permeable to the gas. It should be noted that a certain liquid leakage can be admitted through these vent means 80 provided the pressure loss created by the raising portion remains sufficient to create a rise in pressure in the enclosure and then the move in opening of the valve means.

A first embodiment of a system including a capsule of the invention and a beverage preparation device is illustrated in FIGS. 4 to 8 and is described now. The system comprises a capsule 1 as aforementioned and a beverage preparation device 23. The device has a module 24 which a capsule can be inserted in. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir. Alternatively, the water heater can be placed in the water reservoir itself that becomes a water boiler in such case. Of course, water can also be taken directly from a domestic water supply via a water plug connection. The device may further comprise control means and activation means for activating the beverage preparation method (not illustrated).

Water can be fed in the module 24 at low pressure or even at gravity pressure. For example, a pressure of between 0 and 2 bar above atmospheric pressure can be envisaged at the water inlet of the module. Water at higher pressure than 2 bar could also be delivered if a pressure pump is utilized such as a piston pump.

Figure 5:
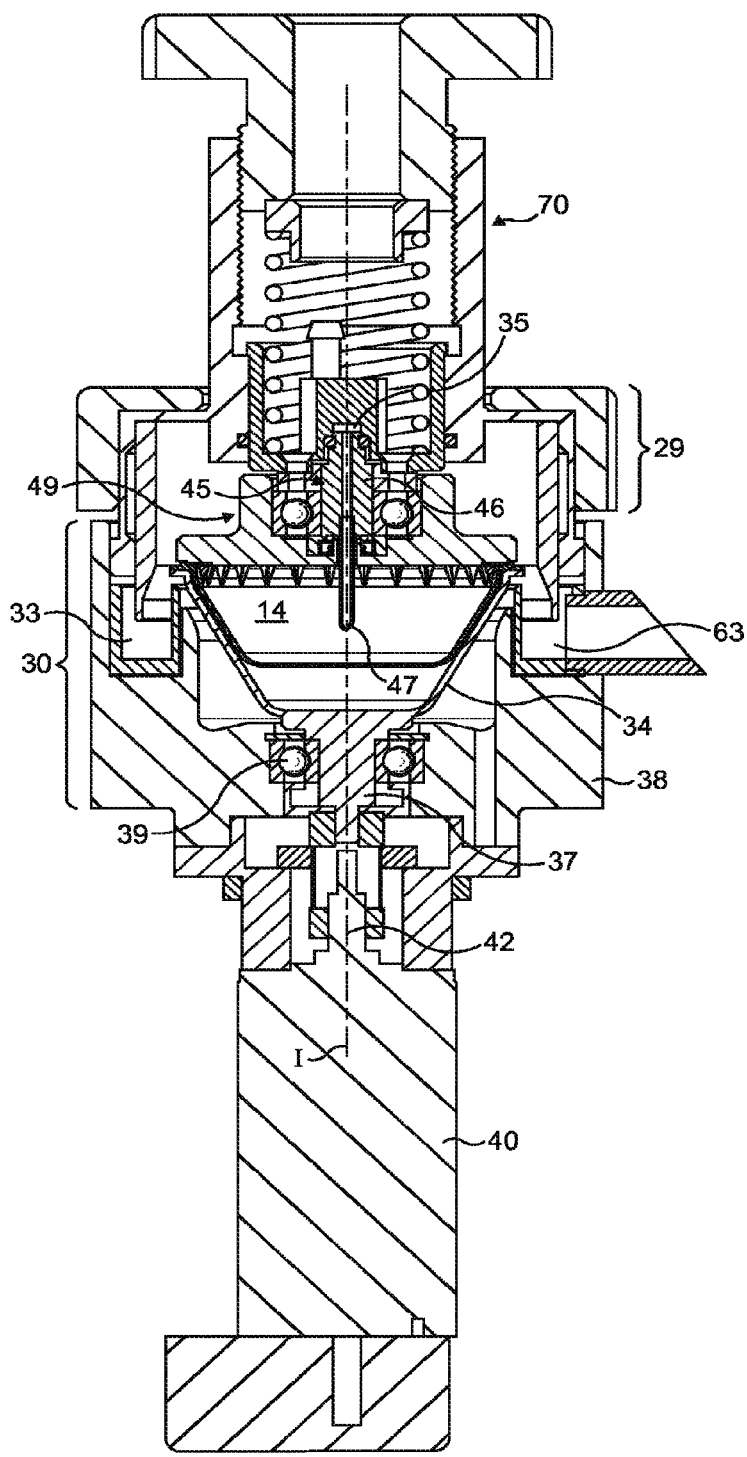
FIG. 5 is a cross sectional view of a beverage production device with a capsule inside.

The brewing module 24 can comprise two main capsule encasing sub-assemblies 29, 30; mainly comprising a water injection sub-assembly or water injection head and a liquid receiving subassembly including a capsule holder. The two subassemblies form positioning and centring means for referencing the capsule in rotation in the device. The two subassemblies' closes together to encase a capsule therein for example by a bayonet-type connection system 31 or any other suitable closure means such as a mechanism based on a jaw-type closure principle. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a U-like or V-like shaped annular section surrounding a capsule holder comprising a rotating drum 34 into which the capsule can be inserted as illustrated in FIG. 5. The liquid receiver 33 defines a collecting cavity 63 for collecting the liquid as will be explained later in the description. Below the liquid receiving subassembly 30, are placed means for driving the capsule receiving drum 34 in rotation inside the subassembly.

The driving means preferably comprise a rotary motor 40 which can be supplied by electricity or gas power. The water injection subassembly comprises a water inlet side comprising a water inlet 35 communicating upstream with the water fluid circuit 27.

The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. A mechanical coupling can be placed at the interface between the rotating shaft 37 of the drum and the shaft 42 of the motor 40.

Considering the water injection subassembly 29, it comprises a centrally arranged water injector 45 which is fixed relative to longitudinal axis I of the device. The water injector comprises a central tubular member 46 for transporting water from the inlet 35 to a water outlet 47 that is intended to protrude inside the enclosure 14 of the capsule. The central tubular member extends by a hollow needle 90 for intruding in the capsule and injecting liquid therein. For this, the water outlet is associated by a puncturing means such as a sharp tubular tip 48 that is able to create a punctured hole through the membrane lid 3 of the capsule.

About the water injector is mounted a rotary engaging part or cover part 49. The engaging part 49 has a central bore for receiving the water injector and rotational guiding means such as a ball or needle bearing 50 inserted between the part 49 and the injector 45. A sealing means 89 is positioned between the ball bearing 50 and the injection needle 90 for preventing ingress of liquid from the capsule inside the bearing.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid which exits the centrifuged capsule. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67.

This portion could of course be replaced by a lever mechanism or a similar handling means.

According to an aspect of the invention, the rotary engaging part comprises perforating members 53 located at the periphery of the part. The perforating members are placed for perforating the membrane 3 of the capsule at its periphery, more particularly, in the annular peripheral area of the top membrane 3 of the capsule. More particularly, the perforating members are formed of sharp projections protruding from the lower surface of the engaging part. The membrane is preferably perforated when the water injection subassembly 29 is moved relative to the capsule, when the capsule is in place in the capsule holder of the lower subassembly 30, during closure of the device, i.e., of the two sub-assemblies 29, 30, about the capsule.

The perforating elements are preferably distributed along at least one (or more) circular path of the part. In a preferred mode, the perforating members 53 are solid (i.e., not traversed by a liquid supply conduit) at the tip.

A valve means 51 is provided in the system in the flow path of the centrifuged liquid downstream of the perforating elements. The valve means can be any suitable valve providing opening or enlargement of the flow path of the centrifuged liquid leaving the capsule when a given threshold of pressure is attained. The valve means is calibrated to open at a given pressure. For instance, the opening pressure is of about 0.5 to 4 bar, preferably of from 1.5 to 2.5 bar, e.g., of about 2 bar, of pressure. Importantly, the calibration depends on the distance "d" of the force-setting portion 8 of the capsule. This is mainly this distance that sets the back-pressure of the valve means by automatically adjusting the pre-load of the valve as will be described later. The calibration of the valve will so determine the flow rate of the delivered beverage for a given rotational speed. In the preferred mode, as illustrated, the valve means comprise a portion of engagement, i.e., a raising portion 8 of the capsule, which projects from the flange-like rim 4 of the capsule, more particularly, from the outer surface of the sealed portion 5. This portion of engagement 8 forms a projection extending upwards from the substantially flat surface of the rim or from comparatively lowered, inward sealing portion 5 of the rim. The portion 8 can be formed integrally from the flange-like rim. In such case, the body 2 of the capsule including the flange-like rim is preferably made of plastics and/or aluminium. On the opposed side, the valve means comprises an engaging surface 83 of the rotary cover part 49. As shown on FIG. 7, a gap for liquid is left between the membrane 3 and the raising portion 8 thereby enabling liquid to traverse the membrane in the radial direction, towards the valve means, without being excessively hindered or blocked in the capsule by the lower surface 54 of the cover. The engaging surface 83 may comprise various shapes depending on the particular shape of the projection 8. In a preferred mode, the engaging surface 83 is a substantially planar surface such as an annular flat surface. The engaging surface may be formed as an annular recessed portion of surface at the periphery of the lower surface 54 of the cover part 49 thereby allowing the base of the perforating members to be lower than the tip or upper compressed surface of the projection 8.

Figure 7:
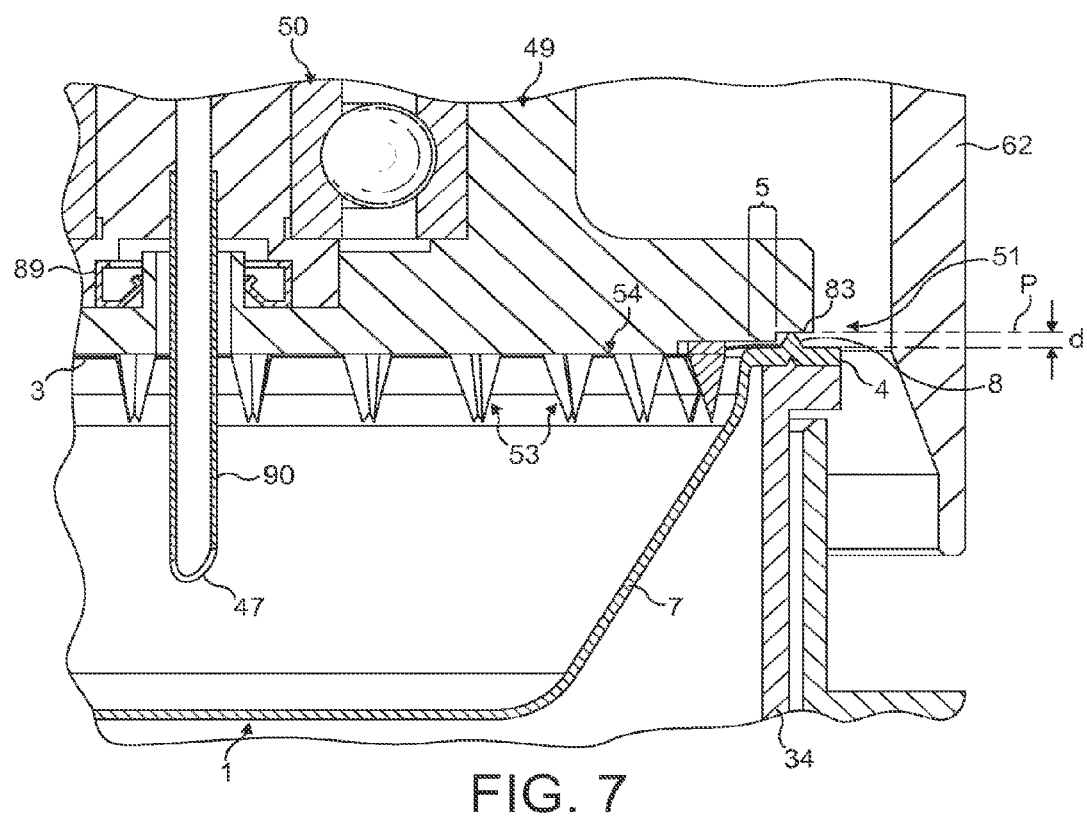
FIG. 7 is an enlarged cross sectional view of the view of FIG. 6 in a closed configuration of the valve means.

In all embodiments of the invention, the height of the raising portion (d) the flange-like rim illustrated on FIG. 7 relative to the inner portion 5 of extending along plane (P) as 7 can be comprised between 0.2 and 10 mm, more preferably, between 0.5 and 5 mm, most preferably between 0.8 and 2 mm.

It should be noted that the engaging surface 83 may take many different shapes other than flat such as concave or convex.

Figure 8:
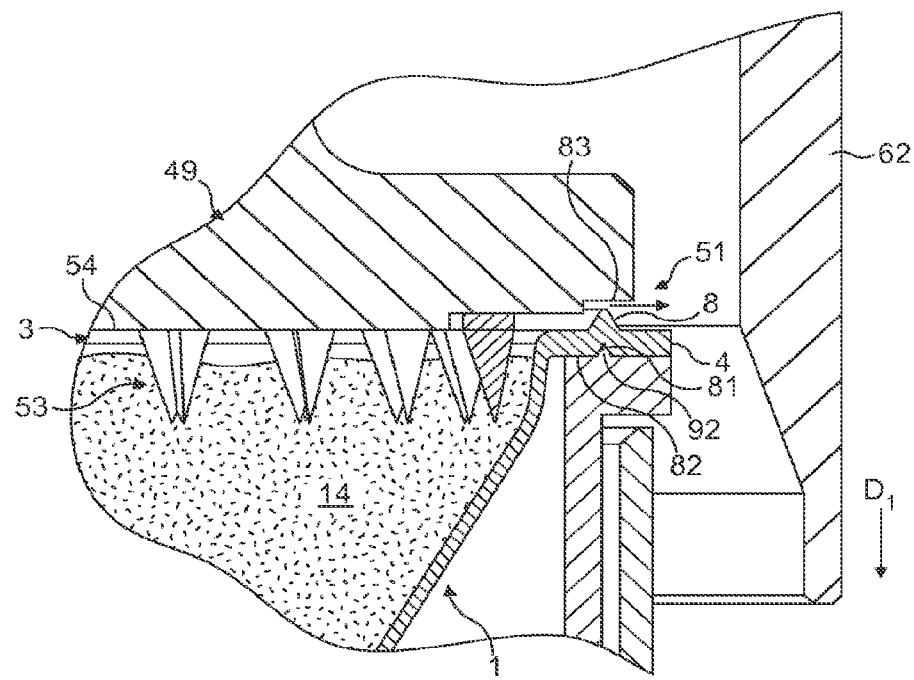
FIG. 8 is an enlarged cross sectional view of the view of FIG. 6 in an open configuration of the valve means.

As illustrated in FIG. 8, the flange-like rim of the capsule can comprise an annular groove 81 on its surface 82 opposed to the projection 8, i.e., the lower surface 82 of the flange-like rim or surface directed towards the bottom 6 of the body. The capsule holder of the device comprises a support portion comprising a support surface from which extends an annular indentation 92 which matches the shape of the annular groove 81 of the capsule. Hence, the indentation 92 can serve to position and reference the capsule in the device as well as to support the annular projection 8 of the valve means when being compressed by the rotary part 49. The indentation 92 can be a sharp annular continuous projection or formed of discontinuous projections distributed on an annular path of the surface of the capsule holder. For instance, the projection and its counter-shape 81 can be formed during the forming of the body of the capsule such as by a manufacturing operation of embossing, deep drawing, injection moulding or thermoforming.

The valve means 51 is designed to close under the force of a resilient closure load obtained by a load generating system 70 comprising a spring-biasing element 71. The spring-biasing element 71 applies a resilient load onto the rotary cover plate 49. The load primarily distributes itself onto the engaging surface 83 acting in closure against the raising portion 8 of the capsule. Therefore, the valve normally closes off the flow path for the centrifuged liquid until a sufficient pressure is exerted on the protrusion by the centrifuged liquid exiting through the orifices created by the perforating elements. The liquid flows thus between the membrane 3 and the upper surface 54 of the rotary cover part 49 and forces the valve 51 to open by pushing the whole cover part 49 upwards against the force of the spring-biasing element 71, as illustrated in FIG. 8. The centrifuged liquid can thus be ejected at a high velocity on the impact surface 62.

Figure 6:
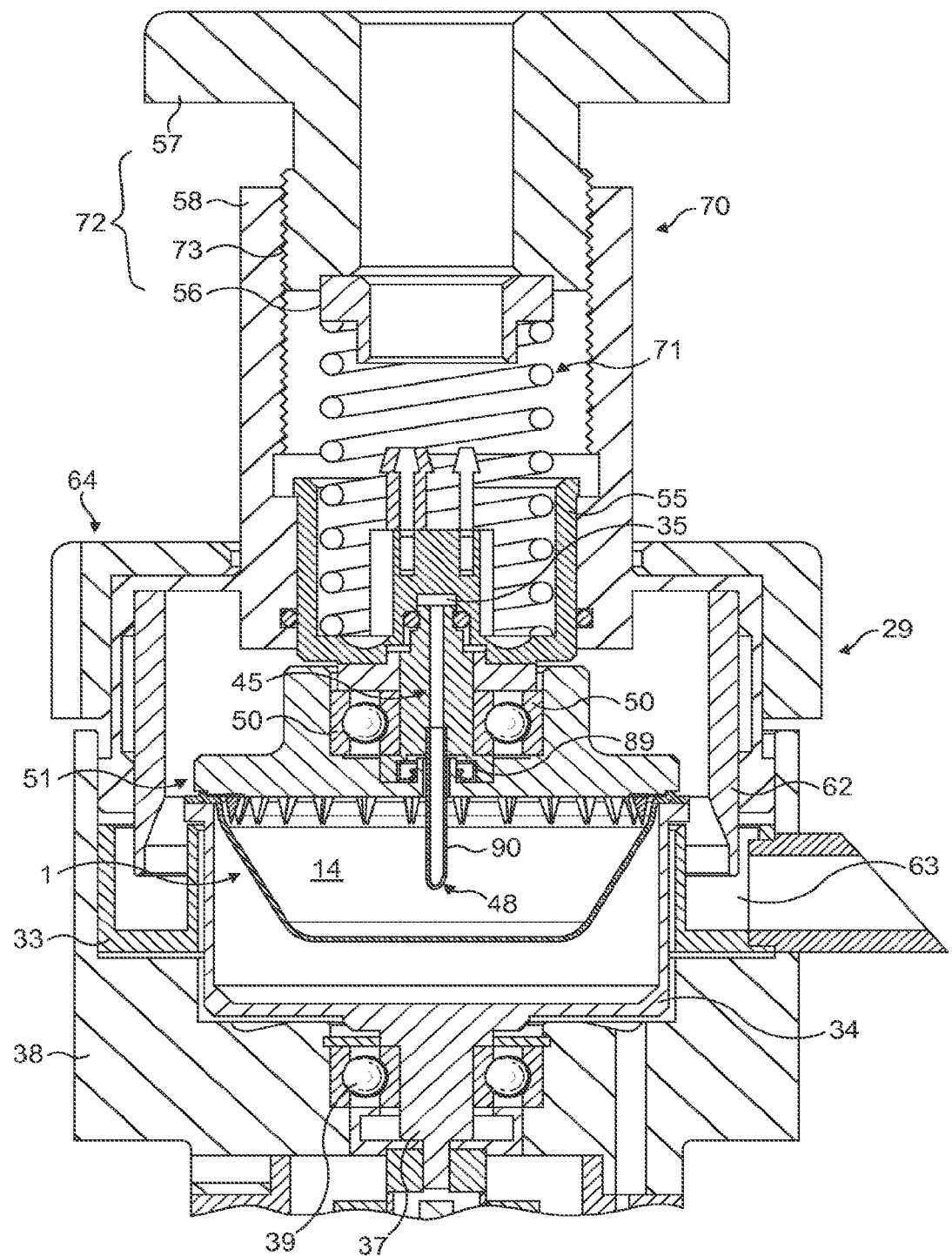
FIG. 6 is a detailed cross sectional view of the view of FIG. 5 in a closed configuration of the valve means.

The load generating system 70 can be made adjustable as illustrated in FIG. 5 or 6, for controlling the opening pressure of the valve means. In particular, the system 70 can comprises a base 55 into which is fitted a first end of the spring-biasing element 71. At the opposed end of the spring-biasing element 71 is fixed, an abutting member 56 further connected to a screw element 57. The base 55, element 71 and abutting member 56 are housed into a tubular frame 58. The screw element 57 and tubular frame 58 form together an actuating means 72 comprising a complementary thread 73 enabling to tune the compressive load of the spring-biasing element 71 on the engaging part 49.

It should be noticed that the elastic means for exerting the load on the valve means can be designed differently. For instance, the elastic means 71, e.g., a spring or rubber-elastic element, can be directly associated to the surface 83 independently from surface 54, e.g., by a separate annular block, or can be associated to a ringshaped protrusion 8 of the valve means.

Figure 9:
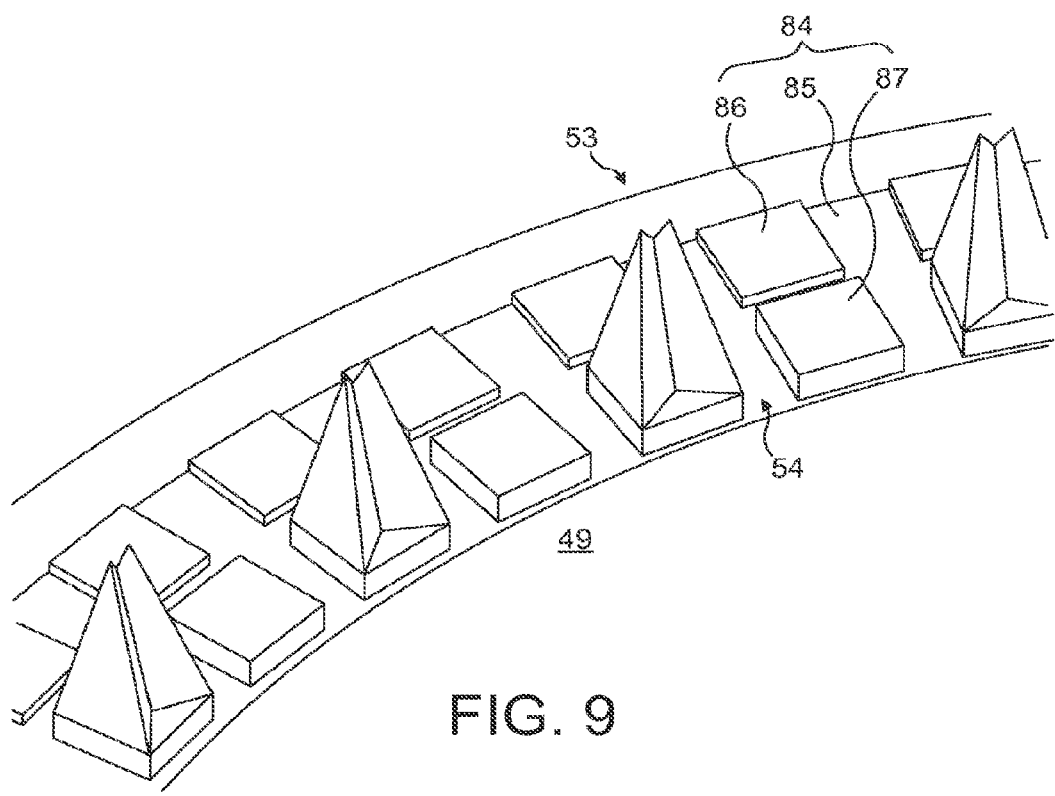
FIG. 9 is bottom perspective view of the cover part of the device showing a detail.

As illustrated in FIGS. 8 and 9, the lower surface 54 of the cover part 49 comprises a series of perforating elements or projections 53 being distributed in a circular pattern in a peripheral region of the surface. Each perforating element 53 will produce a perforation in the upper membrane of the capsule and therefore a passage for the centrifuged liquid for leaving the capsule engaged in rotation. The number of perforating elements can be changed by removing the cover plate and replacing it by a plate having a higher number of perforating elements. Preferably, the surface can comprise channelling means 84 formed by a series of channels 85 provided in the surface 54 in order to ensure that a controlled flow gap remains between the membrane and the cover part between the perforating elements and the valve means. The channels 85 can be formed by relief elements 86, 87 forming distancing means. For instance, a series of relief elements 87 can be provided between the perforating elements 53 to ensure that the membrane does not collapse between the perforating elements which would so cause the blockage of the liquid flow. Furthermore, another series of relief elements 86 can be placed in the flow path between the perforating elements 53 and the valve means to further ensure the presence of channels between the surface 54 and the flange-like rim 4 of the capsule so that the flow of liquid is properly channelled towards the valve means. It should be noticed that the distancing means, e.g., a series of discrete relief elements 86, 87, for maintaining a flow gap could be formed onto the flange-like rim of the capsule. For instance, the flange like-rim can comprise a series of small concentrically-arranged projections distributed inwardly relative to the ring-shaped projection 8 (not illustrated).

Figure 11A:
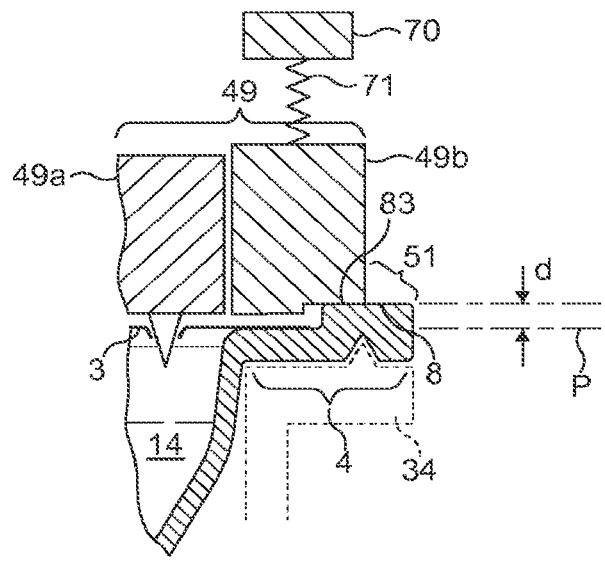
FIG. 11A shows an enlarged cross sectional view of the view of FIG. 10 in a closed configuration of the valve means.
Figure 11B:
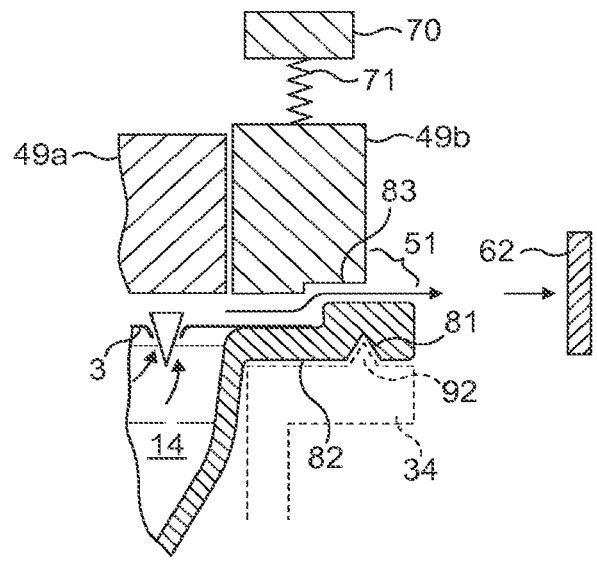
FIG. 11B shows an enlarged cross sectional view of the view of FIG. 10 in an open configuration of the valve means when the liquid is centrifuged out of the capsule.

In another mode of the invention, the annular projection 8 on the surface of the capsule is formed by an element which is made of a material which is different from the material of the flange-like rim of the capsule. The element can be made of a compressible material. The material can be a resilient or non-resilient material. In particular, the element can be made of plastic or can be a rubber O-ring which is sealed onto the flange-like rim. The ring can, for instance, be sealed by heating or ultrasounds or deposited as a liquid, e.g., liquid silicone rubber (LSR), and allowed to harden onto the rim. The projecting element 8 may also be associated by other means to the capsule such as by an adhesive or by clipping into an annular groove of the capsule. FIGS. 10 and 11A, 11B illustrate another embodiment of the invention in which the raising portion 8 is formed as a step raising from the lowered sealed portion 5 of the flange-like rim. The step has a substantially flat upper surface which cooperates in pressing engagement with the lower engaging surface 83 of the cover part 49 of the device to form the valve means. The step may have a width (w) that exceeds the height (d) of the raising portion. Furthermore, the width (w) of the raising portion may also equal or even exceed the width of the sealed portion 5. As apparent in FIG. 11B, a gap is maintained between the upper outer wall 3 of the capsule and the top surface of the raising portion allowing the liquid to circulate toward the valve means 51 without being significantly hindered.

In this mode as well as in any other mode of the present invention, the device may comprise a separation of the cover part 49 into a perforating inner block 49a and an outer valve block 49b. The valve block 49b is annular and independently mounted relative to block 49a against the force of a resilient means 710, e.g., a spring. With such de-coupling configuration of the cover part 49, the pressure load as generated by the valve means 51 is independent from the pressure load applied by the perforating block. Therefore, the opening or enlargement of the valve means 51 as a function of the rotational speed of the capsule can be more reliably controlled during centrifugation. In addition, the position of the outlet perforating members 53 relative to the capsule is not affected when the valve means 51 opens. The filtering of the extracted liquid between the members 53 and the membrane 3 is controlled by the closure of the art 49a onto the capsule and thereby remains constant and effective irrespective of the relative position of the valve means 51.

The capsule of FIG. 10 may further comprise a liquid tightness producing member 91 that engages the needle of the device in a liquid-tight manner (also illustrated in the capsule of FIG. 1). The member 91 ensures that liquid cannot leak out of the capsule through the perforation created by the needle in the membrane. The tightness producing member 91 can be placed on the outer face of the upper wall 3 or on the inner face of this wall. The tightness producing member is preferably made of a rubber elastic and/or fibrous material. It may also extend along the whole outer surface of the wall 3. Other equivalent variations of a capsule comprising a central tightness member are described in co-pending European patent application No. 09169679.9. entitled "Capsule for the preparation of a beverage by centrifugation".

Figure 12:
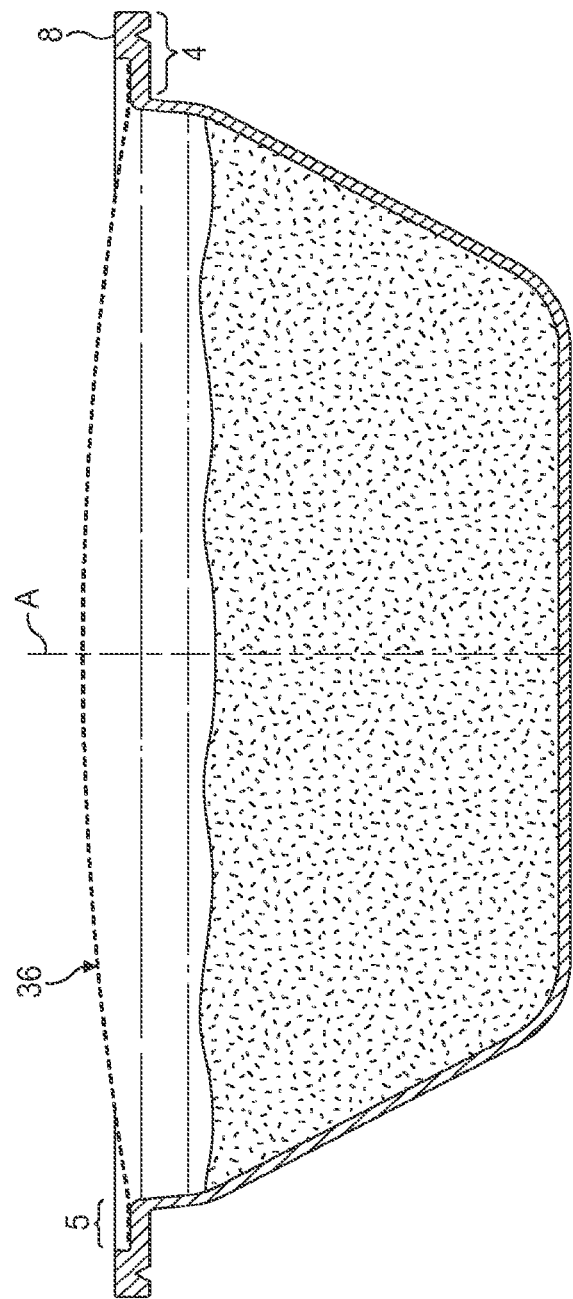
FIG. 12 is a cross sectional view of the capsule according to another embodiment.

The capsule of FIG. 12 illustrates another embodiment in which the perforable membrane constituting the outer wall is replaced by a porous wall 36. The upper wall thus forms a wall which retains beverage ingredients inside the capsule but allows the centrifuged liquid to leave the capsule without requiring perforation. Additionally, liquid may also be introduced in the capsule through the wall without necessarily requiring perforation by a central needle. The wall may be porous to liquid only partially along the wall, e.g., only at the outlet region or inner region or both. The wall may comprise pores of a size comprised between 50 and 500 microns, preferably between 80 and 300 microns. Suitable material for the wall 36 is filter-paper, woven or non-woven polymer (s), a polymeric membrane with size-controlled holes and combinations thereof.

Figure 13:
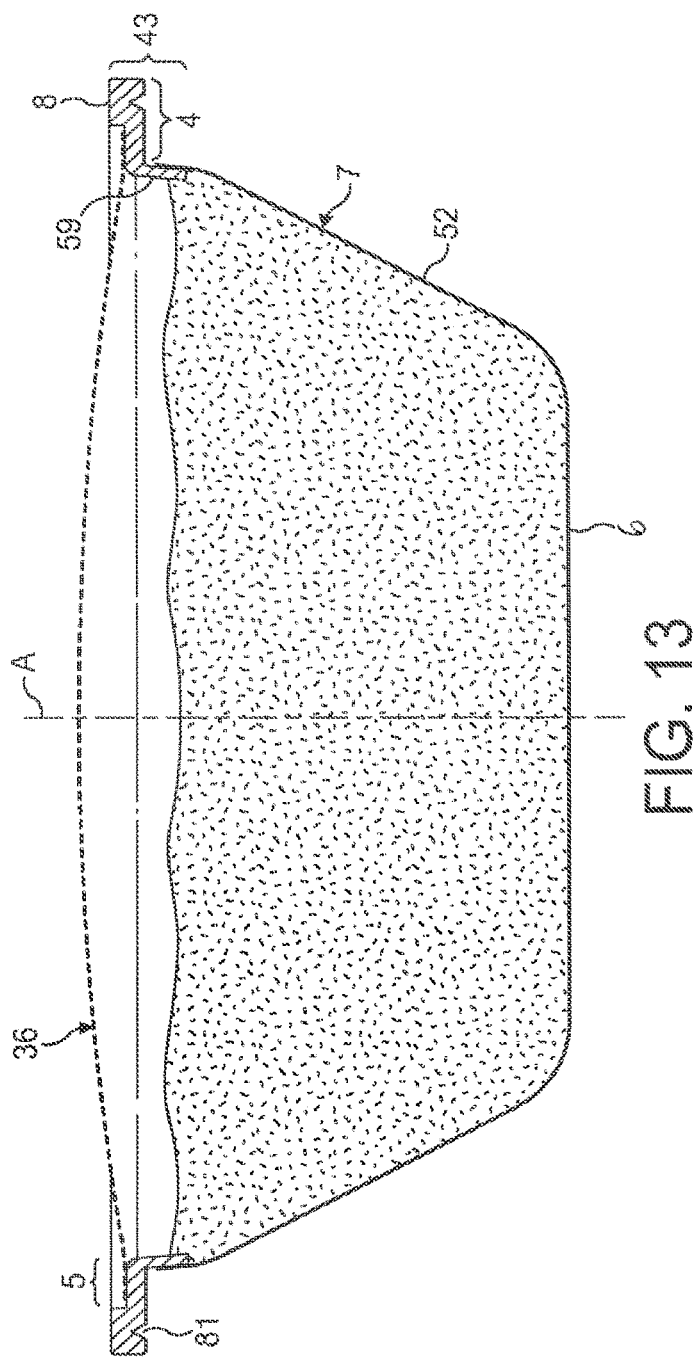
FIG. 13 is a cross sectional view of the capsule according to another embodiment.

The capsule of FIG. 13 differs in that the body of the capsule is formed of at least two components 43, 52 having different rigidity. A first component 43 of the body forms the flange-like rim 4 and a second component 52 of the body forms the essential part of the sidewall 7 and bottom 6. The second component 52 is preferably of a more flexible material than the first component. The second component can be, e.g., a thin aluminium and/or a polymeric foil whereas the first component 43 can be hard plastic. The rim component 43 extends by a connection portion 59 onto which is sealed the flexible lower component 52. Of course, the upper wall can be a porous wall as in embodiment of FIG. 12 or a perforable membrane as in previous embodiments.

Figure 14:
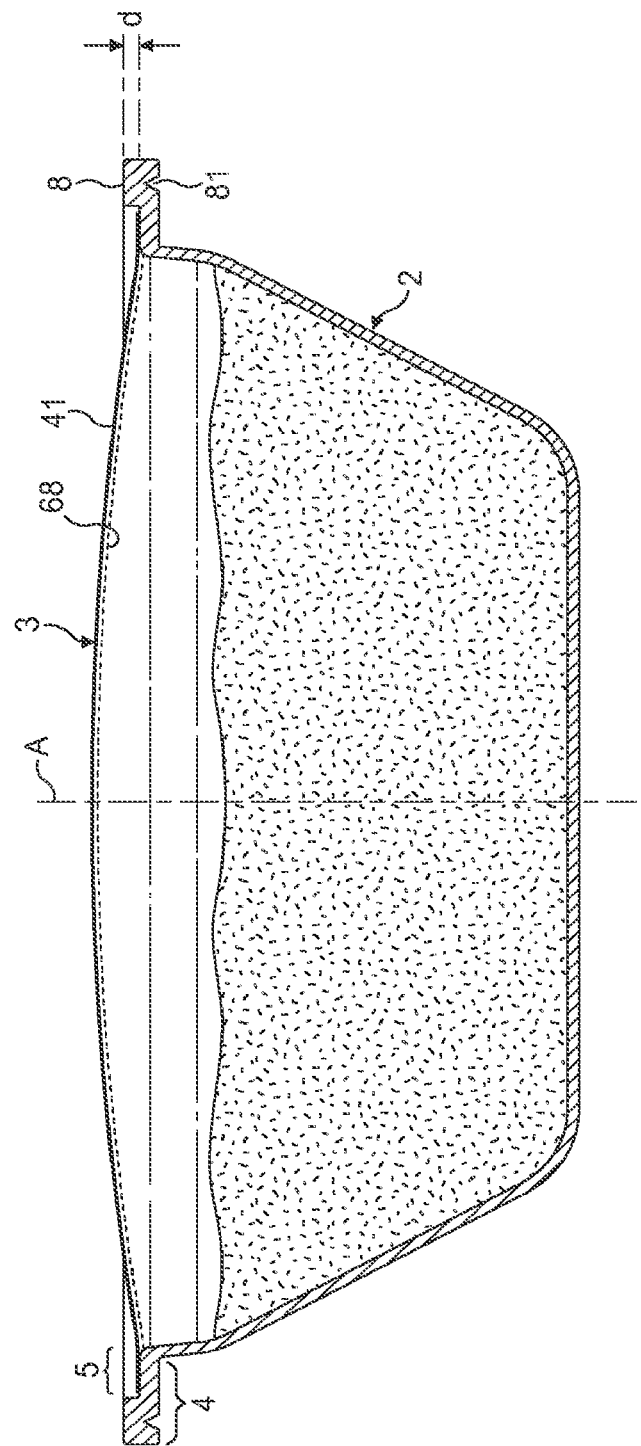
FIG. 14 is a cross sectional view of the capsule according to another embodiment in which the upper wall is formed of a laminate comprising an upper membrane and a lower porous layer.

The capsule of FIG. 14 differs from any other embodiment in, at least, that the upper wall 3 closing on the body of the capsule is formed of at least two layers 41,68; respectively, an outer perforable, liquid-impervious layer 41 and an inner liquid porous layer 68. The multilayer preferably forms a laminate, i.e., a bonded layering arrangement possibly comprising a sealant layer in-between. The inner layer 68 may be formed of resilient plastic such as polypropylene or polyurethane elastomer. The upper layer 41 may be formed of aluminium or an aluPP complex. The inner layer 68 may also be sealed to the upper layer in one or more discrete regions, e.g., in the central region only, and can be loose relative to the upper layer outside said region (s). This can allow ensuring both a liquid-tight arrangement around the central injection needle of the device to avoid bypass of water on the top side of the capsule and a filter function at the periphery of the wall 3 where the liquid is extracted by the centrifugation effect. The capsule of FIG. 14 can be chosen amongst packaging materials that have additionally gas barrier properties in particular for the body 2 and outer membrane 41.

Figure 15:
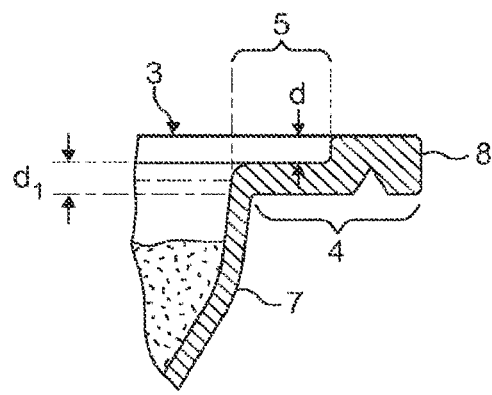
FIG. 15 is a cross sectional view of the capsule according to another embodiment in which the membrane is sealed on top of the raising or force-setting portion.
Figure 16:
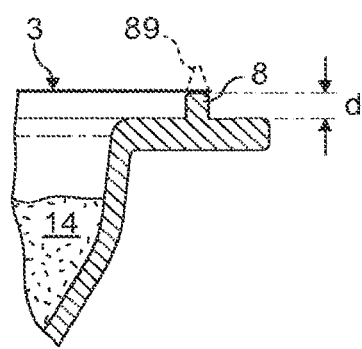
FIG. 16 is a cross sectional view of another variant of the capsule of the invention.

The capsule of FIG. 15 differs from any other embodiment in that the upper wall 3 closing the body of the capsule is sealed onto the top of the raising portion 8. The flange-like rim 4 of the capsule comprises an annular lowered portion 5 merging with the sidewall 7 of the body at one end and merging with the stepped force-setting portion 8 at its other end. However, the lowered portion 5 is distant from the upper wall 3 of distance "d" representing the height of the raising portion 8. The lowered portion 5 has a thickness "d1" smaller than the overall thickness "d+d1" of the rim at the raising portion 8. The thickness d1 can be substantially equal to the thickness of the sidewall. Preferably, the width of the inner portion 5 is larger than its thickness "d1". The capsule of FIG. 18 represents another embodiment, in which the force setting portion 8 is formed by a partially melt energy director onto which is sealed the upper wall 3. The energy director 89 has an initial height (in dotted lines) larger than "d" before ultrasonic sealing of the upper wall 3 but is then reduced to lower height "d" after sealing. As other obvious variations to the present invention, the capsule of the invention can also be a refillable container with an upper wall which can be opened for charging a dose of beverage ingredients in the enclosure. For example, the upper wall is connected to the body by press-fitting. In order to maintain a connection between the upper wall and the body, the two elements can thereby be connected by a local flexible plastic hinge.

The invention claimed is:

1. A method of using a capsule, the method comprising:
   inserting into a beverage production device a capsule comprising an enclosure containing an amount of beverage substance, a cup-like shaped body comprising a sidewall, an upper outer wall closing the cup-like shaped body, and a rim extending outwardly from the cup-like shaped body, the rim comprising an annular raising portion that extends from a top surface of the rim and in a direction opposite to a bottom of the body and that is a force-setting portion of a valve, the beverage production device comprising a plate comprising a pressing surface portion of the valve;
   applying a resilient load from a resilient member onto the plate to engage the pressing surface portion with the force-setting portion, the annular raising portion being rigid to resist compression by the pressing surface portion applying a closure force thereto;
   forming orifices in the upper outer wall in a perforable peripheral area of the upper outer wall by perforating elements;
   preparing a beverage from the beverage substance contained in the capsule by introducing liquid in the capsule and passing the liquid through the beverage substance, the preparing of the beverage comprising using centrifugal forces to produce the beverage, wherein the liquid is centrifuged in a centrifuged liquid flowpath in which the liquid is moved peripherally in the capsule relative to a central axis of the capsule corresponding to an axis of rotation during the use of the centrifugal forces, and engagement of the pressing surface portion with the force-setting portion forms a restriction for the centrifuged liquid flowpath; and forcing the valve to open by the pressing surface portion of the valve being pushed against the resilient member by the centrifuged liquid that is exiting through the orifices and moving away from the annular raising portion for creating a flow restriction gap while the annular raising portion remains of a relatively constant dimension to restrict the centrifuged liquid flowpath through the restriction gap.

2. The method of claim 1, wherein the annular raising portion extends in a direction opposite to a bottom of the cup-like shaped body.

3. The method of claim 1, wherein the annular raising portion extends a certain height ("d") from a relatively flat annular inward portion of the rim merging with the sidewall.

4. The method of claim 3, wherein the annular raising portion creates an increased thickness ("d+d1") on the relatively flat annular inward portion.

5. The method of claim 3, wherein the relatively flat annular inward portion forms a sealed portion for the upper outer wall.

6. The method of claim 1, wherein the annular raising portion extends in a direction substantially perpendicular to a transversal plane of extension of the rim.

7. The method of claim 1, wherein the annular raising portion is made integral with the rim.

8. The method of claim 1, wherein a lower surface of the rim merging with the sidewall of the cup-like shaped body is free of any projection in a direction opposed to the annular raising portion.

9. The method of claim 1, wherein the annular raising portion extends from a top surface of the rim, and the rim comprises an annular groove on a bottom surface directly opposed to the annular raising portion.

10. The method of claim 1, wherein the annular raising portion is embossed in the rim.

11. The method of claim 1, wherein the cup-like shaped body comprises a material selected from the group consisting of aluminum, plastics, and combinations thereof.

12. The method of claim 1, wherein the annular raising portion is a separate element and attached to the rim.

13. The method of claim 12, wherein the annular raising portion is made of rubber elastic material.

14. The method of claim 1, wherein the annular raising portion comprises a gas vent.

15. A method for using a capsule in a beverage production device, the method comprising:

applying a resilient load from a resilient member onto a plate comprising a pressing surface portion of a valve to engage the pressing surface portion with a force-setting portion of the valve, the plate provided by the beverage production device, the capsule comprising an enclosure containing an amount of beverage substance, a cup-like shaped body comprising a sidewall, an upper outer wall closing the cup-like shaped body, and a rim extending outwardly from the cup-like shaped body, the rim comprises an annular raising portion that is the force-setting portion of the valve, wherein the annular raising portion extends in a direction opposite to a bottom of the cup-like shaped body, the annular raising portion being rigid to resist compression by the pressing surface portion applying a closure force thereto wherein the capsule comprises a relatively flat annular inward portion of the rim merging, at one end, to the annular raising portion extending of a certain height therefrom, and, at an opposite end, to the sidewall of the cup-like shaped body;

forming orifices in the upper outer wall; and preparing a beverage from the beverage substance contained in the capsule by introducing liquid in the capsule and passing the liquid through the beverage substance, the preparing of the beverage comprising using centrifugal forces to produce the beverage, wherein the liquid is centrifuged in a centrifuged liquid flowpath in which the liquid is moved peripherally in the capsule relative to a central axis of the capsule corresponding to an axis of rotation during the use of the centrifugal forces, and engagement of the pressing surface portion with the force-setting portion forms a restriction for the centrifuged liquid flowpath; and forcing the valve to open by the pressing surface portion of the valve being pushed against the resilient member by the centrifuged liquid that is exiting through the orifices and moving away from the annular raising portion for creating a flow restriction gap while the annular raising portion remains of a relatively constant dimension to restrict the centrifuged liquid flowpath through the restriction gap.

16. The method of claim 1, wherein a first end of the resilient member is fitted into a base that abuts the plate, and a second end of the resilient member is connected to a screw element; and the method further comprises adjusting the resilient member by rotating the screw element.

17. The method of claim 1, wherein the resilient member is positioned on the central axis of the capsule.

18. The method of claim 9, wherein the annular groove matches a shape of the annular raising portion.

* * * * *